US012259841B2

(12) United States Patent
Coolidge et al.

(10) Patent No.: US 12,259,841 B2
(45) Date of Patent: Mar. 25, 2025

(54) PASSIVE CLOCK SYNCHRONIZATION FOR TIMING

(71) Applicant: Google LLC, Mountain View, CA (US)

(72) Inventors: Ian Kenneth Coolidge, San Diego, CA (US); Shahin Valoth, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/237,171

(22) Filed: Aug. 23, 2023

(65) Prior Publication Data

US 2025/0068581 A1 Feb. 27, 2025

(51) Int. Cl.
*G06F 13/42* (2006.01)

(52) U.S. Cl.
CPC .................................. *G06F 13/423* (2013.01)

(58) Field of Classification Search
CPC ..... G06F 13/423; H04J 3/0673; H04J 3/0658; H04J 3/0667
See application file for complete search history.

(56) References Cited

U.S. PATENT DOCUMENTS

| 8,335,437 | B2 | 12/2012 | Zhao et al. | |
|---|---|---|---|---|
| 8,768,169 | B2 | 7/2014 | Yuan | |
| 8,942,561 | B2 | 1/2015 | Boyd et al. | |
| 2011/0052206 | A1 | 3/2011 | Zheng | |
| 2011/0182428 | A1* | 7/2011 | Zhao | H04L 9/0852 380/256 |
| 2013/0108271 | A1* | 5/2013 | Tang | H04J 3/0638 398/66 |
| 2013/0315265 | A1* | 11/2013 | Webb, III | H04L 43/087 370/516 |
| 2014/0169792 | A1* | 6/2014 | Lee | H04J 3/0673 398/66 |
| 2014/0334582 | A1 | 11/2014 | Bock et al. | |
| 2016/0112182 | A1 | 4/2016 | Karnes | |
| 2018/0351646 | A1* | 12/2018 | Seo | H04J 3/062 |
| 2022/0173884 | A1 | 6/2022 | Mirabito et al. | |
| 2022/0200721 | A1* | 6/2022 | Grosvenor | H04J 3/0667 |
| 2022/0329337 | A1* | 10/2022 | Anand | H04Q 11/0067 |

FOREIGN PATENT DOCUMENTS

CN 101431385 B 3/2012

OTHER PUBLICATIONS

Extended European Search Report for European Patent Application No. 24195745.5 dated Dec. 23, 2024. 9 pages.

* cited by examiner

*Primary Examiner* — Phong H Dang
(74) *Attorney, Agent, or Firm* — Lerner David LLP

(57) ABSTRACT

The present disclosure provides for an architecture for a multi-interface card environment, such as a server that includes multiple network interface cards (NICs) or peripheral component interconnect express (PCIe) cards. The architecture includes a passive optical splitter coupled between a leader clock and the multiple interface cards or PCIes. The optical splitter can be used to distribute clock time from the leader clock to the interface cards. The architecture provides for distribution of timing in a scalable manner in the multi-NIC environments for cloud deployments.

18 Claims, 7 Drawing Sheets

PASSIVE CLOCK SYNCHRONIZATION FOR TIMING

BACKGROUND

Precision time protocol (PTP) is a network-based time synchronization method. PTP is often used to provide clock information from a leader clock to an interface card. The interface card is typically connected to the leader clock via a single link, such as a fiber or cable. When multiple interface cards are connected to a leader clock, multiple fibers or cables are needed to make individual connections for the precision time protocol to operate properly which can be costly. Additionally, without dedicated circuitry, interface card interconnects may cause an inaccurate transfer of clock information due to the jittery nature of the connections between the multiple interface cards and the leader clock.

BRIEF SUMMARY

The present disclosure provides for an architecture for a multi-interface card environment, such as a server that includes multiple network interface cards (NICs) or peripheral component interconnect express (PCIe) cards. The architecture includes a passive optical splitter coupled between a leader clock and the multiple interface cards, such as NICs, PCIe cards, etc. The optical splitter can be used to distribute clock time from the leader clock to the NICs. The architecture provides for distribution of timing in a scalable manner in the multi-NIC environments for cloud deployments.

One aspect of the disclosure provides a method for synchronization in a multi-interface card environment. The method includes transmitting, by a computing device, a synchronization message to a first interface card through a passive splitter, wherein the passive splitter is further coupled to at least one second interface card; receiving, by the computing device, a delay request transmitted by the first interface card through the passive splitter; transmitting, by the computing device, a delay response to the first interface card through the passive splitter; listening, by the second interface card, to the delay request and the delay response through the passive splitter; and synchronizing, by the second interface card, to at least one of the computing device or the first interface card based on the listening.

According to some examples, the second interface card synchronizes to the computing device. According to some examples, the second interface card synchronizes to the first interface card. According to some examples, the passive splitter is a passive optical splitter, such as a 1:2 passive optical splitter.

In some examples, the computing device may be a leader clock in a server. The first and second interface cards may be network interface cards (NICs). In other examples, the first and second interface cards may be peripheral component interconnect express (PCIe) cards.

In some examples, the method may further include listening, by a third interface card coupled to the passive splitter, to the delay request and the delay response through the passive splitter; and synchronizing, by the third interface card, to at least one of the computing device or the first interface card based on the listening.

Another aspect of the disclosure provides a system for synchronization in a multi-interface card environment, the system comprising a computing device, a splitter, and a plurality of interface cards coupled to the computing device through the splitter. The computing device may be configured to transmit a synchronization message to a first interface card through the splitter, receive a delay request transmitted by the first interface card through the splitter, transmit a delay response to the first interface card through the splitter. The second interface card may be configured to listen to the delay request and the delay response through the passive splitter, and synchronize to at least one of computing device or the first interface card based on the listening.

According to some examples, the second interface card synchronizes to the computing device. In other examples, the second interface card synchronizes to the first interface card. The passive splitter may be, for example, a passive optical splitter, such as a 1:2 passive optical splitter. The computing device may be, for example, a leader clock in a server. The first and second interface cards may be network interface cards, peripheral component interconnect express (PCIe) cards, or other interface cards. In some example systems, a third interface card may be coupled to the passive splitter, the third interface card configured to listen to the delay request and the delay response through the passive splitter; and synchronize to at least one of the computing device or the first interface card based on the listening.

DETAILED DESCRIPTION

Figure 1A:
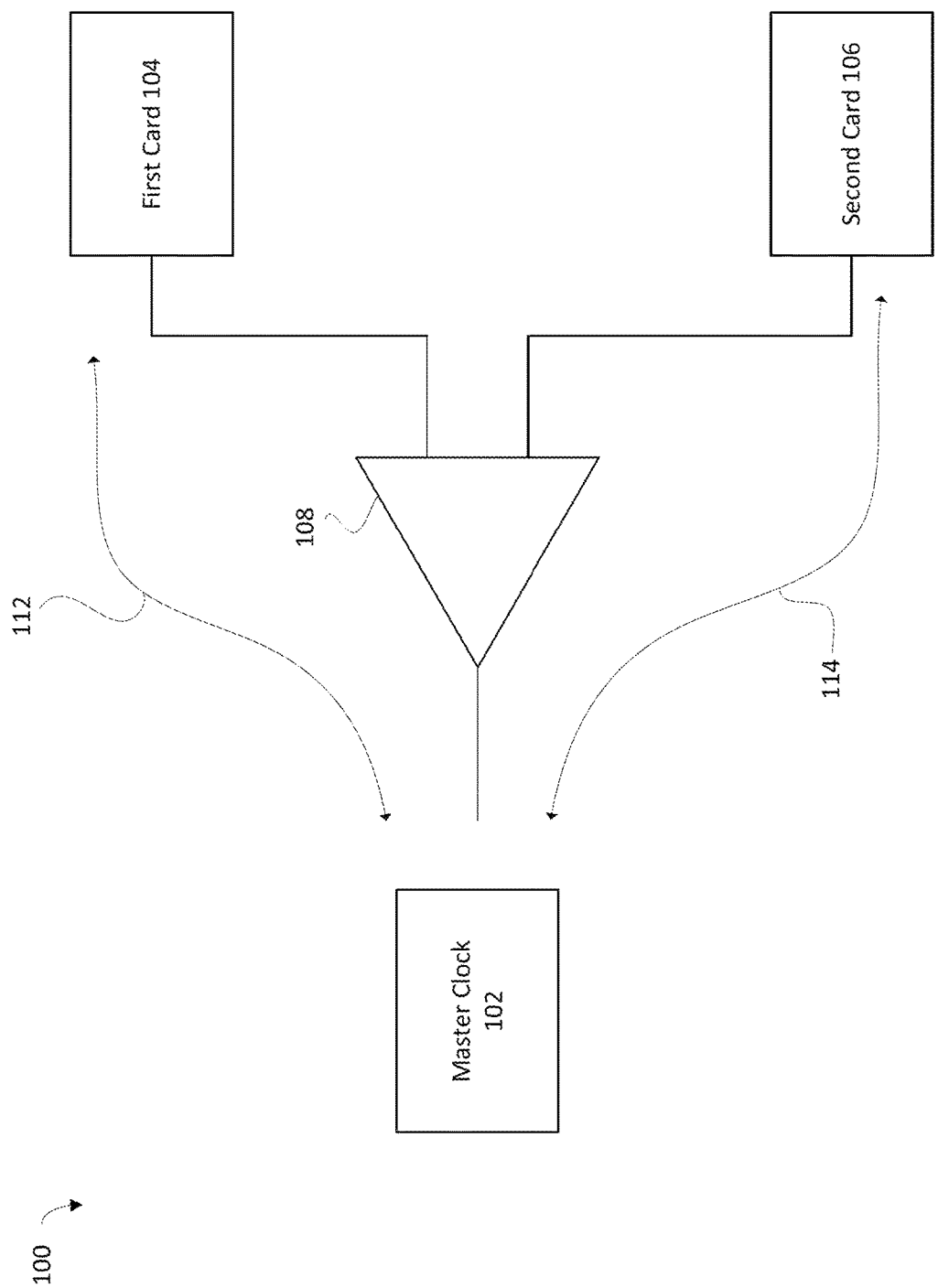
FIGS. 1A-1D depict block diagrams of example passive clock synchronization architectures according to aspects of the disclosure.

The technology provides an architecture for a multi-interface card environment, such as a server that includes multiple network interface cards (NICs) or peripheral component interconnect express (PCIe) cards. The architecture includes a passive optical splitter coupled between a leader clock and the multiple interface cards. The optical splitter can be used to distribute clock time from the leader clock to the interface cards. The architecture provides for distribution of timing in a scalable manner in multi-NIC environments for cloud deployments.

In single interface card environments, precision time protocol (PTP) is often used to provide clock information from the leader clock to the network interface card through a single physical link, such as a fiber or cable. When multiple network interface cards are present, requiring a separate cable for each individual network interface card can be costly. However, without dedicated circuitry, PCIe interconnects may cause an inaccurate transfer of clock information due to the jittery nature of PCIe connections.

According to PTP, at time T1 a leader clock sends a synchronization message to a network interface card that includes a follower clock. The synchronization message is received by the network interface card at time T2 due to a delay. The network interface card sends a delay request at time T3 back to the leader clock, which receives the delay request at time T4 and sends a delay response back to the network interface card. The delay request and response can be used to accurately calculate propagation time across the single physical link between the leader clock and the network interface card. The follower clock may calculate the delay as [(T2+T3)−(T1+T4)]/2, where the accurate delay measurement assumes identical delay in both directions.

The architecture in the present disclosure relies on an external passive optical splitter to transfer clock information via PTP to multiple network interface cards by relying on only one port of one of the network interface cards to calculate the delay. The passive optical splitter may be a 1:2 splitter or other type of splitter depending on the number of network interface cards to be synchronized. For example, a 1:2 splitter may be used to synchronize two network interface cards to the leader clock, a 1:4 splitter may be used to synchronize four network interface cards to the leader clock, etc. A 1:2 splitter passively splits light into a 50:50 ratio. Accordingly, light may be equally split between a first network interface card and a second network interface card. The first network interface card may be coupled to the leader clock through the optical splitter by a first path, whereas the second network interface card may be coupled to the leader clock through the optical splitter by a second path. When the path lengths of the first and second paths are similar, the second network interface card may estimate clock time by combining inputs from the leader clock and the delay information from the first network interface card.

In a process of combining inputs from the leader clock and the delay information from the first network interface card, the leader clock transmits a synchronization message containing the time at T1 which is then received by the first network interface card and the second network interface card at T2. Although the first network interface card and second network interface card may receive the synchronization message at slightly different times, this difference is negligible because the Ethernet receive paths have similar delays. At T3, the first network interface card sends a delay request to the leader clock. The delay request is received at the leader clock at time T4. There may be a non-negligible delay in the transmission due to the packet transiting the transmit chain of the first network interface card and the receive chain of the second network interface card. However, this delay does not affect the delay calculation. The leader clock transmits a delay response at T5 to both network interface cards, the delay response being received by each of the first and second network interface cards at time T6. The first and second network interface cards may receive the delay response at slightly different times, but the time when the second network interface card receives the delay response is not used for computing the estimated delay. The first network interface card may notify the second network interface card of the estimated delay.

The above process allows the second network interface card to receive the synchronization message and delay response from the leader clock, therefore obtaining an accurate clock time, without having to separately request a delay response. By combining the transmissions from the controller and the delay information from a first network interface card, a separate physical connection between the controller and the second network interface card is not needed.

Figure 1B:
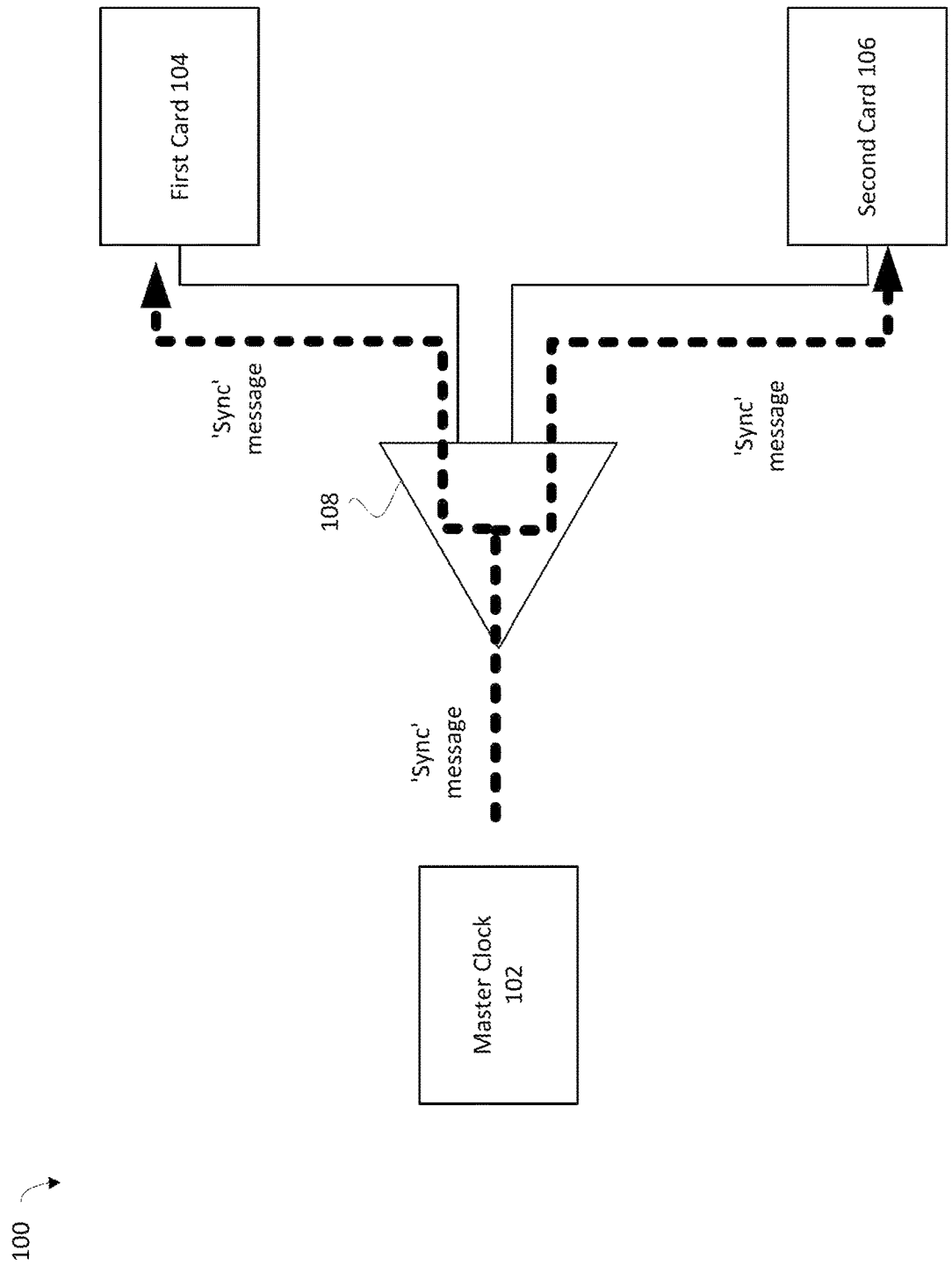
Figure 1C:
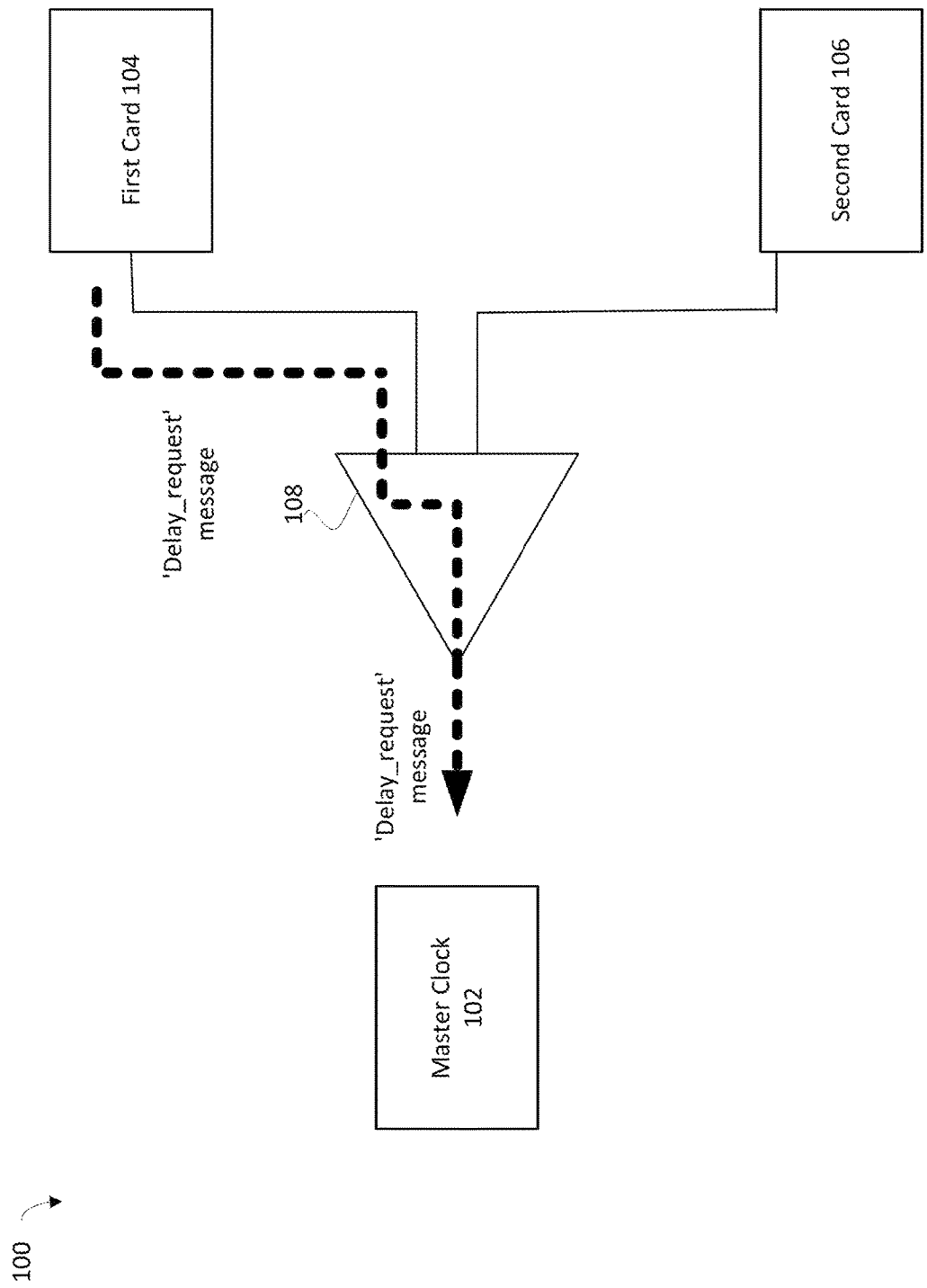

FIGS. 1A-1C depict block diagrams of an example passive clock synchronization architecture 100. Referring to FIG. 1A, the passive clock synchronization architecture may include leader clock 102, first card 104, second card 106, and passive optical splitter 108. leader clock 102 may include any type of electronic device that provides time synchronization signals to one or more follower clocks on a network. leader clock 102 may use any type of global time references and national time references. Global time references may be satellite-based and national time references may be radio-based. leader clock 102 may be a component of a router or a switch on a network. In other examples leader clock 102 may be a component within a server or other computing device.

follower clocks may refer to a hardware device that receives time information from a leader clock. follower clocks typically communicate on a clock network, which may either be a simple wired serial network, a wired pulse signal, or a more complex Ethernet network. First card 104 and second card 106 may be network interface cards (NICs) with controllers that may provide accurate time stamping of incoming and outgoing packets. The NICs may each include a physical hardware clock that functions as a smart clock and the smart clock may be communicable with the leader clock 102. Passive optical splitter 108 may enable a signal on an optical fiber to be distributed among two or more fibers connected to network interface cards.

First card 104 may be locked to or directly communicable with leader clock 102 for PTP through network path 112. First card 104 may not be locked to leader clock 102 but may receive sync messages from leader clock 102 via network path 114.

Referring to FIG. 1B, leader clock 102 may initiate the clock synchronization process by sending a 'sync' message to passive optical splitter 108. The 'sync' message may then be sent to first card 104 and second card 106 through passive optical splitter 108. Passive optical splitter 108 may be a 1:2 splitter or 1:N splitter depending on the number of network interface cards to be synchronized. If leader clock 102 sends the 'sync' message at T1, leader clock 102 records the timestamp at T1. First card 104 and second card 106 may receive the 'sync' message simultaneously at T2 and records the timestamps respectively.

Referring to FIG. 1C, first card 104 may send a 'delay_request' message to passive optical splitter 108. It is to be understood that the 'delay_request' message is not a query message asking leader clock 102 about the network delay, but rather, the 'delay_request' message may only be an additional message that is sent by one of the follower clocks to compute an accurate estimate of the network delay in the later steps. Once passive optical splitter 108 receives the 'delay_request' message, passive optical splitter 108 may send the 'delay_request' message to leader clock 102 and second card 106 may listen to the 'delay_request' message through passive optical splitter 108. For example, leader clock 102 may receive the 'delay_request' message at T4 and records the timestamp at T4.

Figure 1D:
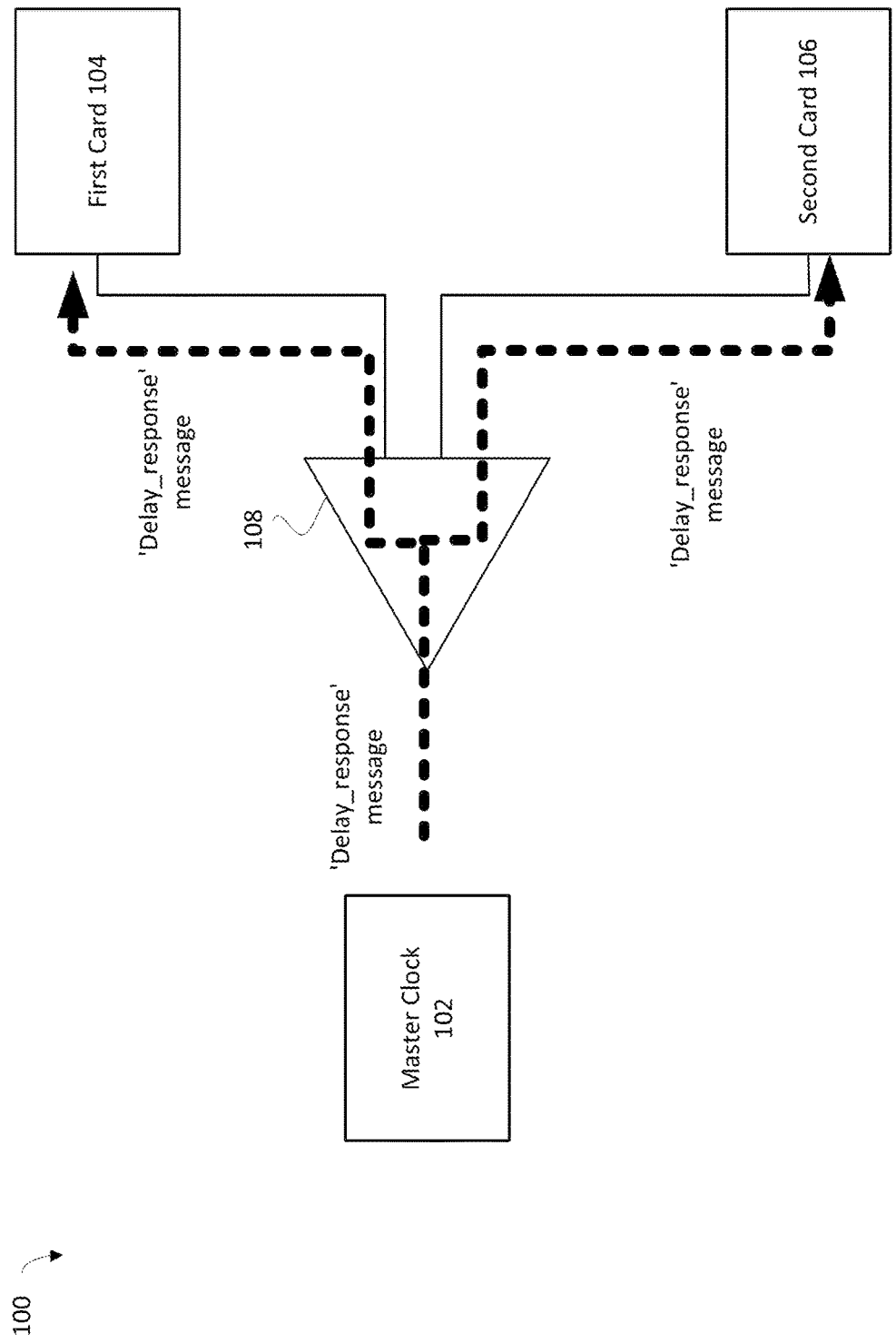

Referring to FIG. 1D, leader clock 102 may send a 'delay_response' message to passive optical splitter 108. The 'delay_response' message may be an additional message that leader clock 102 sends to follower clocks to compute a network delay. In the present example, passive optical splitter 108 may receive the 'delay_response' message first and distribute the message to both first card 104 and second card 106. leader clock 102 may record the timestamp when the 'delay_response' message was sent. For example, leader clock 102 may record its timestamp at T5, and first card 104 and second card 106 may record the timestamps of the time when first card 104 and second card 106 received the 'delay_response' messages at T6. Since passive optical splitter 108 processes the received message and distribute the message signal at a 50:50 ratio, both first card 104 and second card 106 may receive the 'delay_response' message at the same time assuming there are negligible discrepancies between the cable length connecting first card 104 and passive optical splitter 108 and the cable length connecting second card 106 and passive optical splitter 108.

Figure 2:
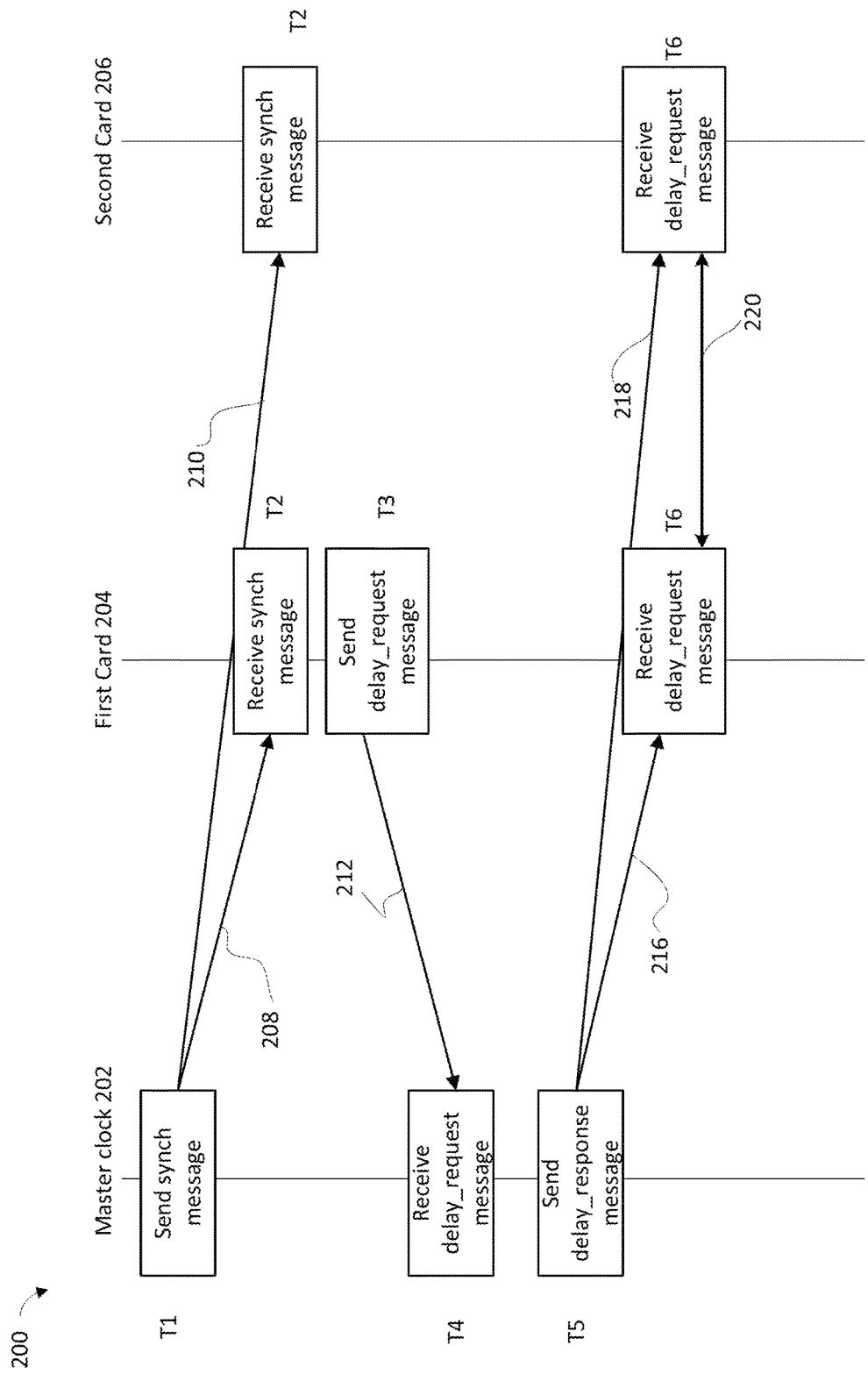
FIG. 2 depicts a block diagram illustrating an example passive clock synchronization according to aspects of the disclosure.

FIG. 2 depicts a block diagram illustrating an example passive clock synchronization 200. According to some examples, leader clock 202 may send messages 208 and 210 at time T1. First card 204 may receive message 208 at T2 and second card 206 may receive message 210 at T2. Messages 208 and 210 may include 'sync' messages and the message may be an initial message transmitted by leader clock 202 to synchronize clocks of first card 204 and second card 206. First card 204 and second card 206 may interact with each other through a passive optical splitter as illustrated in FIG. 1A-1C. At T3, first card 204 may transmit message 212 to leader clock 202. Leader clock 202 may receive message 212 at T4. Message 212 may include messages equivalent to 'delay_request' messages described above in connection with FIGS. 1A-1C. At T5, leader clock 202 may transmit message 216 to first card 204 and message 218 to second card 206. First card 204 may receive message 216 at T6 and second card 206 may receive message 218 at T6. Synchronization 220 may be performed between first card 204 and second card 206 using the delay estimate from the first card 204.

According to some examples, a delay measurement may be computed by averaging the time between T2 and T1 and the time between T3 and T4. The time between T2 and T1 may implicate a delay attributable to a cable or fiber length between the input and output ports of leader clock 202 and first card 204. In other examples, the delay measurement may be computed by averaging the time between T3 and T4 and the time between T5 and T6. Second card 206 may only receive the above-computed delay measurement. That is, second card 206 may not need to directly engage with leader clock 202 to compute a delay measurement.

As the present disclosure utilizes a passive optical splitter that linearly connects to one or more network interface cards, each network interface card may receive the same delay measurement data from the first or representative network interface card that initially transmits a 'delay_request' message to leader clock 202. If second card 206 interacts with leader clock 202 to compute second card 206's own delay measurement without using a passive optical splitter, the result may be slightly different. A reason for such a discrepancy may be a difference in the length of the cable connected between first card 204 and leader clock 202 and the length of the cable connected between second card 206 and leader clock 202.

The present disclosure may be advantageous because a delay measurement is computed once and applied to all other network interface cards connected to the passive optical splitter, thereby preserving the computing resources of the leader clock and reducing the risk of asynchronization among the clocks of multiple network interface cards.

Figure 3:
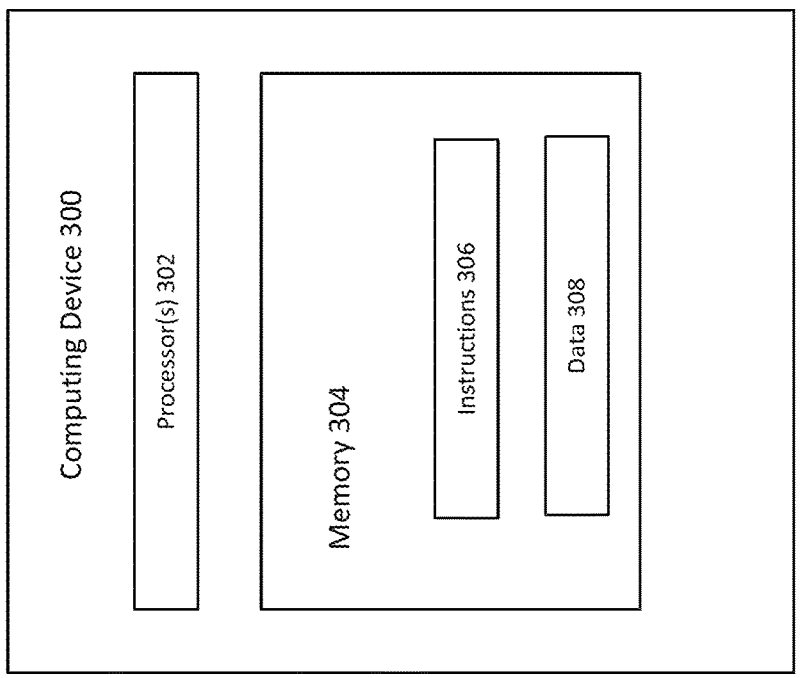
FIG. 3 depicts a block diagram illustrating a computing device according to the aspects of the disclosure.

FIG. 3 illustrates a computing device. leader clock 102, first card 104 and second card 105 as illustrated in FIGS. 1A-1C may be implemented on computing device 300. Computing device 300 may include processor 302, memory 304, user input 310, and user output 312. Memory 304 may include instructions 306 and data 308. Memory 304 may store information accessible by processor 302 including instructions 306 that can be executed by processor 302. Processor 302 may also retrieve, manipulate or store data 308. Processor 302 may include one or more central processing units (CPUs), graphic processing units (GPUs), field-programmable gate arrays (FPGAs), and/or application-specific integrated circuits (ASICs), such as tensor processing units (TPUs).

Instructions 306 can include one or more instructions that when executed by processor 302, cause one or more processors to perform actions defined by the instructions, such as sending 'sync', 'delay_request' or 'delay_response' messages. The instructions 306 can be stored in object code format for direct processing by the processor 302, or in other formats including interpretable scripts or collections of independent source code modules that are interpreted on demand or compiled in advance. Instructions 306 can include instructions for implementing processes consistent with aspects of this disclosure.

Data 308 may include information relating to timestamps recorded when each 'sync', 'delay_request', or 'delay_response' message is transmitted or received. Data 308 can be retrieved, stored, or modified by processor 302 in accordance with instructions 306. Data 308 can be stored in computer registers, in a relational or non-relational database as a table having a plurality of different fields and records, or as JSON, YAML, Protocol Buffers, or XML documents. Data 308 can also be formatted in a computer-readable format such as, but not limited to, binary values, ASCII, or Unicode. Moreover, data 308 can include information sufficient to identify relevant information, such as numbers, descriptive text, proprietary codes, pointers, references to data stored in other memories, including other network locations, or information that is used by an appropriately configured device to calculate relevant data. Data 308 may also include relevant information to compute a delay measurement between a leader clock and a follower clock based on the recorded timestamps for each transaction of the above messages.

Figure 4:
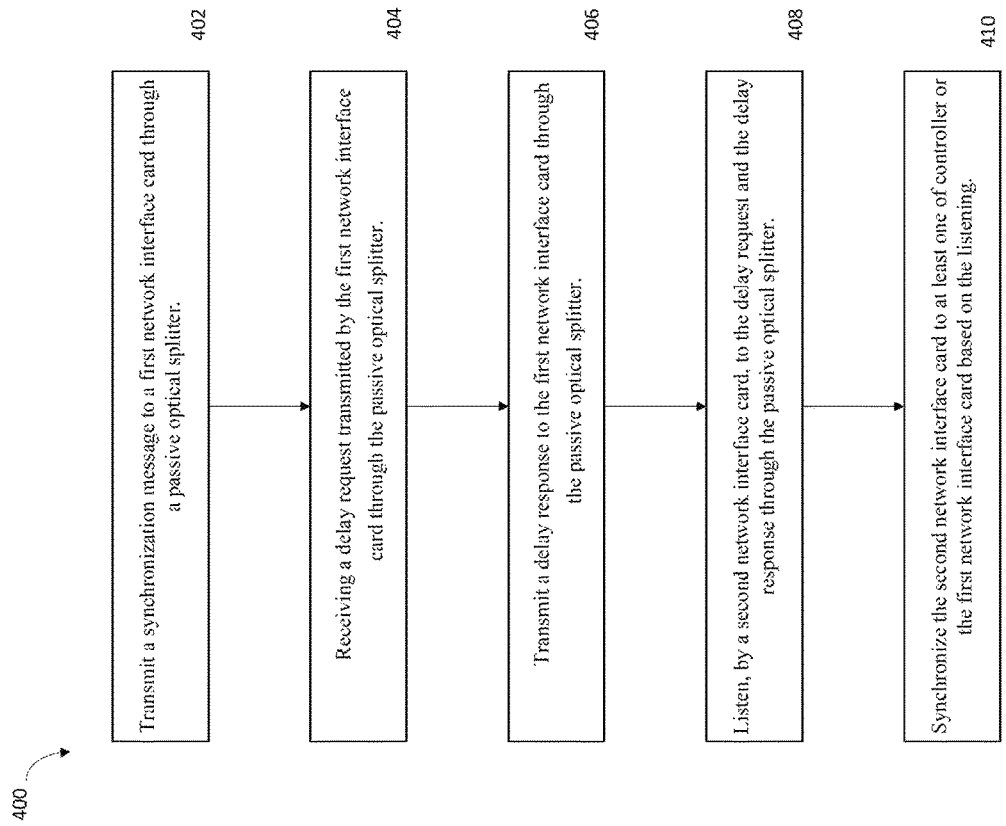
FIG. 4 depicts a flow diagram of an example method for distributing clock information to multiple interface cards according to the aspects of the disclosure.

FIG. 4 depicts a flow diagram of an example method 400 for distributing clock information to multiple interface cards. According to block 402, a synchronization message may be transmitted to a first network interface card through a passive optical splitter. A synchronization message may be transmitted by a computing device, such as a controller. The computing device may include a leader clock. The computing device may transmit the synchronization message simultaneously to the first network interface card and a second network interface card even though the delay measurement may only take into account the delay between the leader clock and the first network interface card. The computing device may transmit the synchronization message directly to a passive optical splitter and the passive optical splitter may distribute the synchronization message to the first network interface card and the second network interface card.

According to block 404, the computing device may receive a delay request transmitted by the first network interface card through the passive optical splitter. The first network interface card may transmit a delay request message either directly to the computing device or through the passive optical splitter. The second network interface card may not need to transmit another delay request message.

According to block 406, a delay response message may be transmitted to the first network interface card through the passive optical splitter. The computing device may transmit the delay response message to the passive optical splitter and the passive optical splitter may distribute the delay response message to both the first network interface card and the second network interface card.

According to block 408, a second network interface card may listen to the delay request and the delay response through the passive optical splitter. The computing device may compute a delay measurement based on the timestamps recorded when the synchronization message was transmitted and received by the first network interface card and the delay request was transmitted by the first network interface card and the delay request was received by the computing device. The average may be computed using the time taken for the synchronization message and delay request message to travel between the computing device and the first network interface card.

According to block 410, the second network interface card may synchronize the second network interface card to at least one of the computing device or the first network interface card based on the listening. According to some examples, the second network interface card may receive the above-computed delay measurement from the first network interface card through the passive optical splitter. In other examples, the second network interface card may receive the computed delay measurement from the computing device.

It is to be understood that the architecture of the present disclosure may include more than two components to be synchronized. For example, the concepts described herein may be used for synchronizing three, four, eight, or any other number of components. Moreover, the architecture of the present disclosure may be used for different environments. For example, the present disclosure may be used to synchronize the clocks between different components such as routers, switches, various microprocessors, and protocol stacks, etc. As such, the synchronized components may be any type of peripheral components, such as PCIe cards, NICs, etc. or other components.

The present disclosure may allow for consistent and reliable synchronization without separate physical connections between multiple network interface cards, and thus, a smaller number of ports are required for each device. Further, since each network interface card does not need to compute an estimated delay, the computing resources of each network interface card may be significantly preserved.

Conditional language used herein, such as, among others, "can," "might," "may," "e.g.," and the like, unless specifically stated otherwise, or otherwise understood within the context as used, is generally intended to convey that certain examples include, while other examples do not include, certain features, elements and/or states. Thus, such conditional language is not generally intended to imply that features, elements and/or states are in any way required for one or more aspects or that one or more aspects necessarily include logic for deciding, with or without author input or prompting, whether these features, elements and/or states are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out features as applied to various examples, it will be understood that various omissions, substitutions, and changes in the form and details of the machines or methods illustrated can be made without departing from the scope of the disclosure. As will be recognized, certain examples described herein can be embodied within a form that does not provide all of the features and benefits set forth herein, as some features can be used or practiced separately from others.

Unless otherwise stated, the foregoing alternative examples are not mutually exclusive, but may be implemented in various combinations to achieve unique advantages. As these and other variations and combinations of the features discussed above can be utilized without departing form the subject matter defined by the claims, the foregoing description should be taken by way of illustration rather than by way of limitation of the subject matter define by the claims. In addition, the provision of the examples described herein, as well as clauses phrased as "such as", "including" and the like, should not be interpreted as limiting the subject matter of the claims to the specific examples; rather, the examples are intended to illustrate only one of many possible examples. Further, the same reference numbers in different drawings can identify the same or similar elements.

The invention claimed is:

1. A method for synchronization in a multi-interface card environment, comprising:
    transmitting, by a computing device, a synchronization message to a first interface card through a passive splitter, wherein the passive splitter is further coupled to at least one second interface card;
    receiving, by the computing device, a delay request transmitted by the first interface card through the passive splitter;
    transmitting, by the computing device, a delay response to the first interface card through the passive splitter;
    listening, by the second interface card, to the delay request and the delay response through the passive splitter; and
    synchronizing, by the second interface card, to at least one of the computing device or the first interface card based on the listening.

2. The method of claim 1, wherein the second interface card synchronizes to the computing device.

3. The method of claim 1, wherein the second interface card synchronizes to the first interface card.

4. The method of claim 1, wherein the passive splitter is a passive optical splitter.

5. The method of claim 4, wherein the passive splitter is a 1:2 passive optical splitter.

6. The method of claim 1, where the computing device comprises a leader clock in a server.

7. The method of claim 1, wherein the first and second interface cards are network interface cards (NICs).

8. The method of claim 1, wherein the first and second interface cards are peripheral component interconnect express (PCIe) cards.

9. The method of claim 1, further comprising:
    listening, by a third interface card coupled to the passive splitter, to the delay request and the delay response through the passive splitter; and
    synchronizing, by the third interface card, to at least one of the computing device or the first interface card based on the listening.

10. A system for synchronization in a multi-interface card environment, the system comprising:
    a computing device;
    a splitter; and
    a plurality of interface cards including a first interface card and a second interface card, the plurality of interface cards coupled to the computing device through the splitter;
    wherein the computing device is configured to:
        transmit a synchronization message to the first interface card through the splitter;

receive a delay request transmitted by the first interface card through the splitter;

transmit a delay response to the first interface card through the splitter;

wherein the second interface card is configured to:

listen to the delay request and the delay response through the splitter; and synchronize to at least one of computing device or the first interface card based on the listening.

11. The system of claim 10, wherein the second interface card synchronizes to the computing device.

12. The system of claim 10, wherein the second interface card synchronizes to the first interface card.

13. The system of claim 10, wherein the splitter is a passive optical splitter.

14. The system of claim 13, wherein the splitter is a 1:2 passive optical splitter.

15. The system of claim 10, where the computing device comprises a leader clock in a server.

16. The system of claim 10, wherein the first and second interface cards are network interface cards.

17. The system of claim 10, wherein the first and second interface cards are peripheral component interconnect express (PCIe) cards.

18. The system of claim 10, further comprising a third interface card coupled to the splitter, the third interface card configured to:

listen to the delay request and the delay response through the splitter; and synchronize to at least one of the computing device or the first interface card based on the listening.

\* \* \* \* \*